United States Patent [19]

Davies

[11] 4,423,093
[45] Dec. 27, 1983

[54] METHOD OF APPLYING POLYARYLENE SULPHIDE COMPOSITIONS TO A BEARING

[75] Inventor: Glyndwr J. Davies, Middlesex, England

[73] Assignee: The Glacier Metal Company Limited, Middlesex, England

[21] Appl. No.: 355,737

[22] PCT Filed: Jul. 3, 1981

[86] PCT No.: PCT/GB81/00129

§ 371 Date: Mar. 3, 1982

§ 102(e) Date: Mar. 3, 1982

[87] PCT Pub. No.: WO82/00182

PCT Pub. Date: Jan. 21, 1982

[30] Foreign Application Priority Data

Jul. 4, 1980 [GB] United Kingdom ............... 8022064

[51] Int. Cl.$^3$ .............................................. B05D 3/02
[52] U.S. Cl. ................................... 427/385.5; 252/12; 524/288; 524/293; 524/299; 524/609; 427/27; 427/388.2; 427/388.5
[58] Field of Search .............. 427/385.5, 388.2, 388.5, 427/27; 524/609, 288, 114, 293, 299, 370, 393; 252/12

[56] References Cited

U.S. PATENT DOCUMENTS 3,968,289  7/1976  Higbee ............................. 427/385.5
4,014,845  3/1977  Grier et al. ..................... 524/293 X
4,036,822  7/1977  Patel ............................. 427/385.5 X Primary Examiner—Thurman K. Page
Attorney, Agent, or Firm—Oblon, Fisher, Spivak, McClelland & Maier

[57] ABSTRACT

A method of applying a coating of polyarylene sulphide to a bearing in which an initmate mixture of a polyarylene sulphide with an aryl ester of an aryl alcohol is applied to a bearing blank and subsequently heated to evaporate the ester and cure the coating. The mixture can be a dry powder mixture, a wet powder mixture, a paste, a suspension a liquid solution or a solid solution. The preferred mixture comprises polyphenylene sulphide and benzyl benzoate.

8 Claims, No Drawings

METHOD OF APPLYING POLYARYLENE SULPHIDE COMPOSITIONS TO A BEARING

The present invention relates to a method of applying polyarylene sulphide compositions to a bearing.

Polyarylene sulphides have properties which make them suitable for use in various situations, for example as plain bearing linings. However, they also possess properties which make their preparation and application inconvenient and frequently difficult.

Available techniques involve the use of toxic chemicals or techniques involving what is essentially powder fusion. The powder fusion techniques limit the roles in which polyarylene sulphides can be used and involve slow processes of low productivity.

One of the properties of polyarylene sulphides which limits their use is their high viscosities in the molten state. This renders the distribution of the material difficult in the extreme and makes it difficult therefore to establish a bond between the polyarylene sulphide and another material. One known method of forming a bond between the polyarylene sulphide and another material is to apply the polyarylene sulphide powder to the other material as level and evenly as possible, and then to melt, cure and cross-link the powder. Water based dispersions of PPS are also known but this is just another form of applying powder since this is what remains after the water has been evaporated.

However, as stated above, using polyarylene sulphide powder involves considerable manufacturing difficulties. Polyphenylene sulphide takes a long time to cure and crosslink particularly when the powder layer is relatively thick. Also since the molten powder has a high viscosity and generally does not flow or wet a surface very well, this results in voids and consequently a poor bond between the polyphenylene sulphide and the other material which bond may fail when under load.

It is also difficult to achieve a precision thickness of polyarylene sulphide which is dimensionally stable and even more difficult to produce a very thin, cured layer.

It is an object of the present invention to provide a method of applying polyarylene sulphide in a workable form in order to minimise the above difficulties in providing a plain bearing having a coating of polyphenylene sulphide.

The present invention is based on the discovery that benzyl benzoate has a plasticizing and, in sufficient quantities, a solvent action on polyphenylene sulphide.

According to the present invention a method of applying a coating of polyarylene sulphide to a bearing is characterised by applying a mixture of polyarylene sulphide and an aryl ester of an aryl alcohol to the surface of a bearing blank, and subsequently heating the mixture to evaporate the ester and to cure the coating.

The mixture may be a two phase mixture of resin or a resin rich phase comprising polyarylene sulphide and a solvent or a solvent rich phase comprising an aryl ester of an aryl alcohol preferably benzyl benzoate. Alternatively, the mixture may be a single phase mixture of the resin in solution in the solvent or vice versa.

The resin phase may further include other resins besides polyarylene sulphide in either a major or minor proportion based on the polyarylene sulphide. Such other resins may include polytetrafluoroethylene, polyimides and polysulphones. The resin phase may also include fillers, pigments, dyes, surface active additives, stabilizers, cross linking agents, coating aids such as silica or titanium oxide powders, and bases to enhance bonding.

The solvent phase may include or comprise mixtures of aryl esters of aryl alcohols, for example one or more of benzyl benzoate, benzyl phthalate, benzyl iosphthalate, and benzyl terephthalate, and other materials acting as diluents or extenders or viscosity reducers for the active solvent and having no non-solvent action such as to prevent the blend having the necessary plasticizer or solvent action for the resin phase as the case may be.

The solvent phase may also include co-solvents which whilst having no significant solvent action on their own enhance the solvent action of the benzyl benzoate.

The solvent phase may also include other solvents for polyphenylene sulphide and when the resin phase includes other resins, solvents for such other resins even if these are not solvents for polyphenylene sulphide though in this case they are preferably miscible with benzyl benzoate to form a single solvent phase.

The compositions of the invention may extend from solid particulate materials containing polyphenylene sulphide plasticized by benzyl benzoate or solid workable bodies of polyphenylene sulphide plasticized by benzyl benzoate to slurries of polyphenylene sulphide plasticized or not by benzyl benzoate in liquid vehicles which contain benzyl benzoate the benzyl benzoate either being in the polyphenylene sulphide or in the liquid vehicle or in both, to pastes of polyphenylene sulphide plasticized or not with benzyl benzoate suspended or dissolved in benzyl benzoate or benzyl benzoate containing vehicles or spreadable, dippable or sprayable solutions of polyphenylene sulphide in benzyl benzoate or benzyl benzoate containing solvents.

The polyarylene sulphide resin that can be used in the present invention may be a polymer made by the method disclosed in U.S. Pat. No. 3,354,129 but in general can be represented as a polymer including a recurring unit of the formula

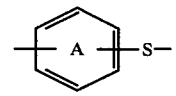

in which the ring A may be substituted.

One such form of substitution may be represented by the formula

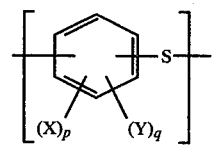

in which:

X represents a fluorine, chlorine, bromine or iodine atom, preferably chlorine or bromine, and Y represents a hydrogen atom,

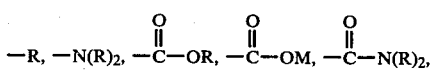

-continued

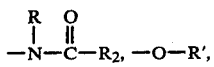

—S—R', —SO₃H or —SO₃M groups in which:

R represents a hydrogen atom, an alkyl, cycloalkyl, aryl, aralkyl, or alkaryl group containing 1 to 12 carbon atoms and in which:

M represents an alkali metal atom of a sodium or potassium atom and in which:

p is 0 to 4 and q is 2 to 4.

Polyphenylene sulphide in which the repeat unit can be represented by the formula

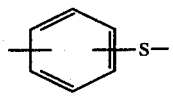

is preferred.

The polyarylene sulphides may be partially oxidized or may have a branched or cross linked structure though non-cross linked polymers or ones having a low degree of cross linking and thus relatively low M.W. are preferred e.g. those having M.W.'s in the range 17,500 to 5000. More generally polyarylene sulphides having melting points in the range of 280° C. to 300° C. are preferred. Also materials having intrinsic viscosities in chloronapthalene at 260° C. of at least 0.1, e.g. 0.1 to 0.3 especially 0.13 to 0.23 are preferred.

Polyphenylene sulphide has a solubility parameter of 8.5 to 9.5. Uncured PPS sold under the Trade Mark Ryton V1 has a melt flow index of 1000 g/min. by the American Society Test Method (ASTM, D1238. Using the same test, part cured PPS sold under the Trade Marks Ryton P2 and P3 have melt flow indices of 300 and 125 g/min. respectively. In those compositions including PPS in particulate form the particle size may be in the range 10–200 microns and use of powder of such particle size is convenient as a starting point for the preparation of single phase systems in accordance with the invention.

The preferred solvent compounds for use in the present invention may be represented by the formula

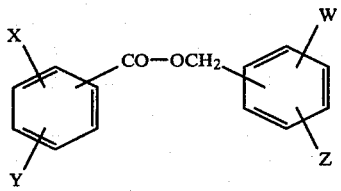

where X, Y, W and Z represent a hydrogen atom or a halogen atom e.g. a chlorine atom.

The most preferred compound is Compound I, when X, Y, W and Z are all hydrogen. A less preferred compound is Compound I when W or Z is chlorie and X, Y and Z or W are hydrogen, namely benzyl monochlorobenzoate.

Benzyl benzoate has the following properties:
melting point 18°–20° C.
boiling point 320° C.
solubility parameter 9.3

Other solvent compounds which may be used in the present invention may comprise phenyl benzoate, di-phenyl phthalate, di-benzyl ether, benzoic anhydride and di-phenyl sulphone.

According to a preferred aspect of the invention there is provided a method of coating a bearing backing comprising mixing polyarylene sulphide with an aryl ester of an aryl alcohol, applying the mixture to the backing, and subsequently evaporating the ester, and at least partly curing the polyarylene sulphide simultaneously to leave the polyarylene sulphide in an at least partly cured state.

Preferably the polyarylene sulphide is polyphenylene sulphide and preferably the ester is benzyl benzoate.

The resin and ester may both be in the solid state and thus may be in the form of a powder mixture. Alternatively, the ester may be in the liquid state so that the mixture may be a paste or slurry of resin in the ester or may be a solution of the resin in ester.

The components are preferably heated until they form one continuous liquid phase. The liquid may be cooled at this stage for example in order to promote precipitation of the resin in the form of fine crystals in the ester.

This step is not absolutely necessary in all cases but may be advantageous for example if it is desired to store the formulation for any length of time.

Preferably the nature of the ester and the resin are such that when the mixture is heated the resin and ester form a single phase and as the ester evaporates, the resin undergoes curing. Preferably the ester does not evaporate completely until the resin is almost completely cured. Preferably a minimum of ester is employed since this may be lost in evaporation.

The method according to the invention may therefore render it possible to produce a cured polyarylene sulphide in the form of a thin film having a thickness hitherto thought to be unobtainable for example as low as from 1 to $4 \times 10^{-6}$ m, for example $3 \times 10^{-6}$ m.

Various methods may be employed in applying the mixture prior to curing. In the case of a dry powder mixture this may be applied for example by electrostatic spraying, dry powder spraying or by fluidised bed methods. In the case of a paste or wet powder this may be applied for example by wet spraying or spreading while in the case of slurries and solutions these may be applied by wet spraying or by painting or the article to which the resin is to be applied may be dipped into the mixture.

The invention may be carried into practice in various ways and will be illustrated in the following specific examples. All percentages in the following examples are by weight.

Examples 1 to 18 are examples of bearing blanks coated with polyphenylene sulphide.

EXAMPLE 1

8% uncured polyphenylene sulphide sold under the Trade Mark Ryton V1 was mixed with 92% benzyl benzoate. The mixture was heated to a temperature in the range 250° to 290° C. by which time the polyphenylene sulphide had dissolved in the benzyl benzoate. A cold bearing blank formed from an aluminium alloy including 6% tin or 11% silicone was immersed for 0.5 seconds and withdrawn. A coating of solution had adhered to the blank. The coated blank was transferred to an air circulatory oven and maintained at a temperature between 300° and 310° C. for five minutes. The temperature was then increased to a temperature between 370° to 380° C. for a further 15 minutes after which time the benzyl benzoate had evaporated and the polyphenylene sulphide was fully cured. The layer of polyphenylene sulphide produced was approximately 0.001 cm in thickness.

EXAMPLE 2

30% uncured polyphenylene sulphide were dissolved in a solution comprising 10% diphenyl phthalate and 60% benzyl benzoate and held at a temperature between 250° 290° C. A bearing blank similar to that used in example 1 was immersed in the solution for 2 minutes thus allowing the blank and solution to reach a thermal equilibrium. The blank, with an adherent coating of solution, was transferred to an oven and heated to a temperature between 300° and 310° C. for five minutes and then to a temperature between 370° and 380° C. for a further 15 minutes. A coating similar to that obtained in example 1 was obtained.

EXAMPLE 3

A suspension of uncured polyphenylene sulphide was prepared by mixing 30% polyphenylene sulphide with 10% diphenyl phthalate and 60% benzyl benzoate, heating the mixture to a temperature between 250° and 290° C. in order to dissolve the polyphenylene sulphide, and subsequently cooling the solution to a room temperature while maintaining a vigorous agitation. A fine cloudy gelatinous suspension of polyphenylene sulphide was thus formed. The suspension was sprayed on to two bearing blanks of an aluminium alloy containing 6% tin or 11% silicone, one of which was at room temperature and the other of which was heated to about 250° C. The sprayed blanks were transferred to an oven where they were held at a temperature between 300° and 310° C. for five minutes and then held at a temperature between 370° and 380° C. for a further 15 minutes. An adherent coating of polyphenylene sulphide 0.001 cm thick was produced on each blank.

EXAMPLE 4

A water-based slurry was produced by ball milling together for 24 hours 30% uncured polyphenylene sulphide, 49% unsaturated calcium hydroxide solution, 1% of a nonionic surfactant (as sold under the Trade Mark Triton X 100)20% diphenyl sulphone. This slurry was used to spray coat two blanks as described in example 3 above and similar coatings were obtained.

EXAMPLE 5

A bearing blank of an aluminium alloy including 6% tin or 11% silicone, at room temperature, was sprayed with a solution comprising 10% phenyl benzoate in 90% benzyl benzoate until the surface sprayed was fully wet but not dripping. The wetted surface was sprayed electrostatically with a powder mixture of 99% polyphenylene sulphide and 1% calcium hydroxide. The blank was placed in an oven and heated to a temperature of between 300° and 310° C. for 5 minutes followed by being heated to a temperature between 370° and 380° C. for a further 15 minutes. As in the previous examples a satisfactory thin coating was obtained.

EXAMPLE 6

This was carried out in the same way as example 5 but with diphenyl phthalate replacing phenyl benzoate. Similar results were obtained as those of example 5.

EXAMPLE 7

This was carried out in the same was as example 4 but the calcium hydroxide solution was replaced with an aqueous suspension of polytetrafluoroethylene comprising between 15 and 30% polytetrafluoroethylene. Similar results were obtained to those of example 4.

EXAMPLE 8

The following ingredients were mixed intimately in a high speed mixer: 70% uncured polyphenylene sulphide, 20% diphenyl sulphone, 9% diphenyl phthalate and 1% calcium hydroxide. The mixture was electrostatically sprayed on to a bearing blank of an aluminium alloy including 6% tin or 11% silicone, at room temperature. The blank was placed in an oven where it was heated to a temperature between 300° and 310° C., held at that temperature for 5 minutes and subsequently raised to a temperature between 370° and 380° C. for 15 minutes. An adherent coating of polyphenylene sulphide was obtained having a thickness of 0.001 cm approximately.

EXAMPLE 9

This was carried out in the same was as example 8 except that the blank was at a temperature between 350° and 370° C. prior to its being sprayed with the mixture. Similar results were obtained to those of example 8.

EXAMPLE 10

This was carried out in the same way as example 1 but with the uncured polyphenylene sulphide replaced by 99% part cured polyphenylene sulphide (sold under the Trade Mark Ryton P2) and 1% calcium hydroxide powder. Similar results were obtained to those obtained in example 1 but it was found that the curing time was shorter than in example 1.

EXAMPLE 11

This was carried out in the same way as example 2 but an uncured polyphenylene sulphide was replaced by a mixture of 99% part cured polyphenylene sulphide and 1% calcium hydroxide, and the diphenyl phthalate/benzyl benzoate mixture was replaced by benzyl benzoate alone. Similar results were obtained to those of example 2 but it was found that the curing time was shorter than in example 2.

EXAMPLE 12

This was carried out in the same way as example 3 but the uncured polyphenylene sulphide was replaced by a mixture of 99% part cured polyphenylene sulphide and 1% calcium hydroxide, and the diphenyl phthallate/benzyl benzoate mixture was replaced by benzyl benzoate alone. Similar results were obtained to those in example 3 but it was found that the curing time was shorter than in example 3.

EXAMPLE 13

This was carried out in the same way as example 4 but the uncured polyphenylene sulphide was replaced entirely by part cured polyphenylene sulphide. Similar results were obtained to those obtained in example 4 but it was found that the curing time was shorter than in example 4.

EXAMPLE 14

This was carried out in the same way as example 5 but the uncured polyphenylene sulphide was replaced entirely by part cured polyphenylene sulphide. Similar results were obtained to those obtained in example 5 but it was found that the curing time was shorter than in example 5.

EXAMPLE 15

This was carried out in the same way as example 6 but the uncured polyphenylene sulphide was replaced entirely by part cured polyphenylene sulphide. Similar results were obtained to those obtained in example 6 but it was found that the curing time was shorter than in example 6.

EXAMPLE 16

This was carried out in the same way as example 7 but the uncured polyphenylene sulphide was replaced by a mixture of 99% part cured polyphenylene sulphide and 1% calcium hydroxide. Similar results were obtained to those obtained in example 7 but it was found that the curing time was shorter than in example 7.

EXAMPLE 17

This was carried out in the same way as example 8 but the uncured polyphenylene sulphide was replaced entirely by part cured polyphenylene sulphide. Similar results were obtained to those obtained in example 8 but it was found that the curing time was shorter than in example 8.

EXAMPLE 18

This was carried out in the same way as example 9 but the uncured polyphenylene sulphide was replaced entirely by part cured polyphenylene sulphide. Similar results were obtained to those obtained in example 9 but it was found that the curing time was shorter than in example 9.

What is claimed as new and desired to be secured by Letters Patent of the United States is:

1. A method of applying a coating of polyarylene sulphide to a bearing which comprises:
    applying a mixture of polyarylene sulphide and an aryl ester of an aryl alcohol to the surface of a bearing blank; and
    subsequently heating said mixture to evaporate said ester and to cure said coating.
2. A method according to claim 1 wherein said polyarylene sulphide is polyphenylene sulphide.
3. A method according to claim 1 wherein said ester is benzyl benzoate.
4. A method according to claim 1 wherein said mixture is a dry powder mixture.
5. A method according to claim 1 wherein said mixture is in the form of a paste.
6. A method according to claim 1 wherein said polyarylene sulphide is in suspension in said ester; said ester being in the liquid phase.
7. A method according to claim 1 wherein said polyarylene sulphide is dissolved in said ester.
8. A method according to claim 1 wherein said ester is in solid solution in said polyarylene sulphide.

* * * * *